United States Patent [19]
Dumbaugh, Jr.

[11] Patent Number: 5,100,452
[45] Date of Patent: Mar. 31, 1992

[54] MAKING GLASS ARTICLES WITH DEFECT-FREE SURFACES

[75] Inventor: William H. Dumbaugh, Jr., Painted Post, N.Y.

[73] Assignee: Corning Incorporated, Corning, N.Y.

[21] Appl. No.: 645,048

[22] Filed: Jan. 24, 1991

Related U.S. Application Data

[63] Continuation-in-part of Ser. No. 524,721, May 17, 1990, abandoned.

[51] Int. Cl.$^5$ ............................................. C03C 23/00
[52] U.S. Cl. ................................................ 65/23; 65/31; 501/75; 501/49; 501/52; 156/663; 156/155; 156/657; 156/630
[58] Field of Search .................. 65/23, 31; 501/49, 52, 501/75; 156/657, 663, 155, 630

[56] References Cited

U.S. PATENT DOCUMENTS 4,102,664 7/1978 Dumbaugh ............................ 65/23
4,880,453 11/1989 Coppola ................................ 65/23

Primary Examiner—Kenneth M. Schor
Assistant Examiner—John M. Hoffman
Attorney, Agent, or Firm—C. S. Janes, Jr.

[57] ABSTRACT

The present invention relates to a method for making a glass article having at least one surface which is essentially defect-free and is at least equivalent in smoothness to a polished surface. The method includes the steps of:

(a) bringing into contact with each other a body of a glass which is relatively insoluble in an acid solution and a body of a glass consisting essentially, expressed in terms of cation percent on the oxide basis, of 70–85% $B_2O_3$, 7–20% BaO, 0–10%, PbO, 0–12% $R_2O$, wherein $R_2O$ consists of $Li_2O+Na_2O+K_2O$, 3–15% PbO+$R_2O$, the glass from its setting point to room temperature having a linear coefficient of thermal expansion within about $5\times10^{-7}$/°C. of that of the relatively insoluble glass, a strain point within 10° C. of the strain point, of the relatively insoluble glass, a liquidus temperature below that of the relatively insoluble glass, a viscosity at the forming temperature at least ten times that of the relatively insoluble glass, and being at least 100 times more soluble in an acid solution than the relatively insoluble glass, the contact being at a temperature wherein at least the more soluble glass is in fluid form to produce a laminate having an interface between the glass bodies which is essentially free of defects;

(b) cooling the laminate to solidify each glass present in fluid form; and thereafter (c) contacting the laminate with an acid solution to dissolve away the more soluble glass.

8 Claims, No Drawings

MAKING GLASS ARTICLES WITH DEFECT-FREE SURFACES

This is a Continuation-In-Part application of application Ser. No. 07/524,721, filed May 17, 1990 abandoned.

BACKGROUND OF THE INVENTION

U.S. Pat. No. 4,102,664 (Dumbaugh, Jr.) provided the first detailed disclosure of fabricating glass articles having defect-free surfaces which can be equivalent in smoothness to that prepared through grinding and polishing. Thus, the patented process eliminates the need for expensive mechanical grinding and polishing and comprises the following five general steps:
  (a) two glass forming batches of different compositions are melted, one batch for a glass which is highly soluble in a given solvent, and a second batch for a glass which is relatively insoluble in the same solvent;
  (b) the molten glasses are brought together while in the liquid state, i.e., at viscosities no greater than about $2.5 \times 10^5$ poises, to form a laminated glass body wherein the insoluble glass is enveloped within the soluble glass;
  (c) the glass layers are fused together at a temperature at which they are sufficiently fluid to provide a defect-free interface therebetween;
  (d) the laminated article is cooled; and subsequently
  (e) the soluble glass layer is dissolved away in an appropriate solvent.

As can be appreciated, a most vital feature of the process resides in providing glass compositions exhibiting very different solubilities in a particular solvent. The patent mandates that the outside glass layer be at least 10 times and, more preferably, greater than 100 times more soluble than the inside glass.

In a preferred embodiment the outside and inside glass compositions were selected so that an exchange of ions occurred between the two layers when they were brought into contact with each other and/or when the laminated body was heat treated. That exchange was asserted to enhance the solubility of the outside glass and/or to increase the mechanical strength of the inside glass.

The patent disclosed three general families of glasses suitable for use as the relatively insoluble inside glasses; viz., alkali metal aluminosilicate glasses; alkali metal zinc silicate glasses, and alkali metal, alkaline earth metal (predominantly Sr) silicate glasses. The patent referred to four general families of glasses operable as the soluble glasses; viz., alkali metal silicate glasses, various metaphosphate-type glasses, barium borosilicate glasses, and various borate-based glasses.

With respect to processing parameters for forming the laminated precursor body, the patent mandated the following three requirements:
  (1) the coefficient of thermal expansion of the soluble glass from room temperature to the set point thereof will not exceed that of the inside glass, preferably it will be somewhat lower;
  (2) the viscosity of the soluble glass will be equal to or somewhat lower than that of the inside glass; and
  (3) the liquidus temperatures of both glasses will most preferably be below the lamination temperature in order to avoid the onset of devitrification.

U.S. Pat. No. 4,880,453 (Coppola et al.) described a modification of the basic process disclosed in U.S. Pat. No. 4,102,664 which was directed expressly to protecting the surface of soda lime glass articles, and providing a surface thereof having the smoothness of a conventionally ground and polished glassware. That is, during the formation of a soda lime glass into an article of a desired configuration, the surface thereof was clad with a glass composition specifically designed to be more soluble in a particular solvent than soda lime glass. The patent set out five vital properties listed below with which the cladding glass had to comply:
  (a) A coefficient of thermal expansion compatible with that exhibited by soda lime glass, preferably between $75-95 \times 10^{-7}/°$ C. over the range of 25°–300° C.
  (b) A solubility in a particular solvent of at least 100 and, preferably, more than 1000 times greater than that of soda lime glass.
  (c) Sufficient thermal stability so that it does not devitrify during the forming process.
  (d) A composition most preferably free of components which react to any substantial extent with soda lime glass. The patent warns that any reaction taking place between the cladding glass and the soda lime glass must not deleteriously affect the soda lime glass or adversely affect the smoothness of the surface of the soda lime glass when the cladding glass is dissolved away.
  (e) A viscosity between $10^4$–$10^8$ poises, preferably about $10^7$ poises, at the temperature at which the laminated glass article is formed. Most preferably, the viscosity of the cladding glass is at least ten times less than that of soda lime glass at the forming temperature. In view of those findings, it was determined that the softening point of the cladding glass comprised a useful reference point. That determination resulted in the ascertainment that the softening point of the cladding glass should range about 575°–650° C. (The softening point of soda lime glass sheet produced via the float process typically ranges about 727° C.).

Because the glass compositions reported in U.S. Pat. No. 4,102,664 did not demonstrate the necessary combination of melting and forming characteristics to be useful as cladding glasses for soda lime glass, U.S. Pat. No. 4,880,453 disclosed glass compositions expressly devised for that purpose. Those glasses consisted essentially, expressed in terms of weight percent on the oxide basis, of:

| | | | |
|---|---|---|---|
| Li$_2$O | 0.7–7.5 | K$_2$O | 0–5 |
| PbO | 18–27 | Na$_2$O + K$_2$O | 0–7 |
| Li$_2$O + PbO | ≦32 | Al$_2$O$_3$ | 0–5 |
| BaO | 35–50 | B$_2$O$_3$ | 30–50 |
| Na$_2$O | 0–5 | SiO$_2$ | 5–10 |

In the original concept of fabricating glass articles having defect-free surfaces as disclosed in U.S. Pat. No. 4,102,664, the process envisioned cladding the inside durable glass on all sides. In that situation close matching of the thermal expansions of the two glasses is not very critical; it is only necessary that the cladding glass has a thermal expansion essentially the same as, or somewhat lower than, that of the inside glass. Nevertheless, in many applications the durable glass is protected on one side only. Under those circumstances the thermal expansions must be very closely matched, i.e., within about $5 \times 10^{-7}/°$ C. from the setting point of the softer glass to room temperature. (As employed herein, a "soft" glass exhibits a low softening point.) Additionally, I have found that the strain points exhibited by the two glasses must be closely similar. Thus, I have observed that, upon cooling the laminated article from the forming temperature, if either glass passes through its transformation range while the other is appreciably more fluid, wrinkling of the harder glass can occur. (The transformation range of glass has been generally defined as the temperature at which a molten mass becomes an amorphous solid, that temperature typically being deemed to reside in the vicinity of the annealing point of a glass.) Finally, as was disclosed in U.S. Pat. No. 4,880,453, the viscosity of the cladding glass ought to be at least one order of magnitude less than that of the durable glass at the forming temperature. In essence, then, each durable glass that is to be fabricated with defect-free surfaces requires a soluble cladding glass that is specifically designed for it.

Therefore, the primary objective of the present invention was to devise a base family of glass compositions wherein, through relatively minor variations in the concentrations of the components, the glasses can perform as cladding glasses for a wide range of durable glasses.

A specific objective of the instant invention was to design a base family of soluble glass compositions suitable for use with durable glasses having coefficients of thermal expansions ranging between about $65-95 \times 10^{-7}/°$ C.

SUMMARY OF THE INVENTION

Those objectives can be achieved in barium borate-based glasses containing PbO and/or alkali metal oxides. As was noted previously, when selecting a soluble glass to clad a durable glass, several critical parameters must be observed:

(a) the linear coefficients of thermal expansion of the two glasses should essentially match; i.e., they will be within about $5 \times 10^{-7}/°$ C. and, most desirably, will be within about $2 \times 10^{-7}/°$ C. from the setting point of the softer glass to room temperature;

(b) the strain points of the two glasses must be closely similar; i.e., they will be within about 10° C. and, most preferably within 5° C.;

(c) the cladding glass will be at least 100 times more soluble in a particular solvent than the durable glass;

(d) the viscosity of the cladding glass must be at least ten times less than that of the durable glass at the forming temperature; and (e) the liquidus of the cladding glass should be lower than that of the durable glass.

Binary barium borate glasses exhibit high solubilities in dilute acids, but do not demonstrate coefficients of thermal expansion and viscosity characteristics suitable for cladding any significant range of durable glasses. By invention is based upon the discovery that, through the incorporation of lead oxide and/or alkali metal oxides in barium borate-based compositions, glasses satisfying the above criteria can be produced.

Accordingly, expressed in terms of cation percent, boric oxide contents between about 70-85% have been found to be operable. At levels above 85% the thermal expansion tend to become too low for many durable glasses, and at concentrations below 70%, the glasses tend to become too fluid. Barium oxide contents between about 6-20% have been found to be operable. At amounts above 20% the viscosity of the glasses at the transformation range tends to be too high, and at levels below 7% the thermal expansion tend to be too low. Lead oxide in concentrations up to about 10% has been found to be quite effective in reducing the viscosity of barium borate glasses in the transformation range thereof and in lowering the liquidus temperature. At lead oxide contents substantially above 10% the viscosity of the glass in the transformation range tends to become too low. The incorporation of alkali metal oxides in amounts up to about 12% is operable in not only decreasing the viscosity of barium borate glasses at the transformation range, but also in raising the thermal expansion thereof. A maximum of about 12% has been deemed proper inasmuch as significantly higher levels tend to raise the thermal expansion too high.

In general, when present alone, the minimum operable concentration of either PbO or alkali metal oxide will range about 3% with the total of both components not exceeding about 15%. The preferred glass compositions contain a combination of PbO + alkali metal oxide at a minimum level of about 5% and at a maximum concentration of about 13%. As employed herein, $R_2O$ designates alkali metal oxides and includes $Li_2O$, $Na_2O$, and $K_2O$. $Al_2O_3$ may be optionally included to adjust the properties of the glass. It appears to be particularly useful in amounts up to 5% in reducing the liquidus temperature. Small amounts, less than about 6% CaO and 7% $SiO_2$ may also be optionally incorporated to adjust properties of the glasses. $SiO_2$ raises the softening, annealing, and strain points of the glasses while lowering the linear coefficient of thermal expansion thereof. CaO raises the softening, annealing, and strain points of the glass and sharply raises the thermal expansion. Excessive levels of $SiO_2$ also adversely affect the acid solubility of the glasses. Finally, it must be noted that in lead-free glass compositions containing alkali metal oxides, $Na_2O$ concentrations in excess of 10% do not yield good glasses where the $B_2O_3$ content is greater than about 75%; in contrast, $K_2O$ concentrations in excess of 10% do form good glasses where the $B_2O_3$ content is greater than about 75%. The opposite situation occurs at $B_2O_3$ levels less than about 75%; i.e., good glasses result from $Na_2O$ contents in excess of 10%, whereas like $K_2O$ contents do not yield good glasses. The total of all components other than BaO, $B_2O_3$, PbO, and/or $R_2O$ will not exceed about 12%. The linear coefficients of thermal expansion of the inventive glasses range between about $65-95 \times 10^{-7}/°$ C. and the softening points will be below about 640° C.

When a durable glass is clad with a thin layer of soluble glass exhibiting a linear coefficient of thermal expansion and/or strain point outside of the permitted ranges of differences specified above and the laminate so produced is cooled to solidification, the surface of the durable glass will not have the desired polished surface finish after the soluble glass is removed. That is, the surface appearance will vary from gross pitting to a slight hazy character, depending upon the magnitude of differences.

For example, where the linear coefficients of thermal expansion of the durable glass and the soluble glass were virtually identical, but the difference between the strain points of the two glasses exceeded 20° C., pits of substantial size were visually observed in the surface of the durable glass after the soluble glass had been dissolved away. In another example the strain points of the durable glass and the soluble glass were about 10° C.

apart, but the difference between the linear coefficients of thermal expansion of the two glasses was about $20 \times 10^{-7}$/° C., the surface of the durable glass exhibited a hazy appearance after the soluble glass had been dissolved away, necessitating mechanical polishing to secure its removal. Electron spectroscopy for chemical analysis (ESCA) detected no significant change in the surface chemistry of the durable glass, thereby indicating that the haze was not the result of chemical attack. Microscopic analysis and scanning electron microscopy (SEM) have served to demonstrate that the haze is the result of waviness in the surface on a very small scale.

Although it is not mathematically possible to convert ranges in cation percent to exact ranges in weight percent, the following values represent approximations of the base glass compositions expressed in terms of weight percent.

| $B_2O_3$ | 40-70 | $R_2O$ | 0-10 |
|---|---|---|---|
| BaO | 20-50 | $Al_2O_3$ | 0-6 |
| PbO | 0-35 | $SiO_2$ | 0-7 |

In a similar manner to the description presented in U.S. Pat. Nos. 4,102,664 and 4,880,453, glass articles exhibiting at least one surface which is substantially defect-free and equivalent in smoothness to conventionally ground and polished glass surfaces can be fabricated in accordance with the following steps:

(1) bringing into contact with each other a body of a glass which is relatively insoluble in an acid solution and a body of a glass consisting essentially, expressed in terms of cation percent on the oxide basis, of 70-85% $B_2O_3$, 7-20% BaO, 0-10% PbO, 0-12% $R_2O$, wherein $R_2O$ consists of $Li_2O + Na_2O + K_2O$, 3-15% PbO+$R_2O$, 0-5% $Al_2O_3$, 0-6% CaO and 0-7% $SiO_2$, said glass from its setting point to room temperature having a linear coefficient of thermal expansion within about $5 \times 10^{-7}$/° C. of that of said relatively insoluble glass, a strain point within about 10° C. of the strain point of said relatively insoluble glass, a liquidus temperature below that of said relatively insoluble glass, a viscosity at the forming temperature at least ten times less than that of said relatively insoluble glass, and being at least 100 times more soluble in an acid solution than said relatively insoluble glass, said contact being at a temperature wherein at least said more soluble glass is in fluid form to produce a laminate having an interface between said glass bodies which is substantially free of defects;

(2) cooling said laminate to solidify each glass in fluid state; and thereafter (3) contacting said laminate with an acid solution to dissolve away said more soluble glass whereby the surface of said relatively insoluble glass from which said more soluble glass has been removed is rendered substantially defect-free and is at least equivalent in smoothness to a conventionally ground and polished glass surface.

As can be appreciated, the laminate described above is produced through the two bodies of glass being brought into contact with each other to form mating surfaces which are joined together into an integral laminate. Thus, as has been explained, the laminate may be prepared in accordance with the following three general processes:

(a) both bodies of glass can be in fluid form upon contact; or (b) the relatively insoluble glass can be in solid form and only the soluble glass is in fluid form upon contact; or (c) both glass bodies can be in solid form upon contact and at least the contacting (mating) surfaces thereof are exposed to a temperature at which at least the soluble glass is placed in fluid form. As a matter of convenience, the entire laminate will be heated to a temperature sufficient to place at least the more soluble glass in fluid form, but that practice is not mandatory. Localized heating of the mating surfaces, e.g., through laser heating, can be utilized.

From economic considerations aqueous solutions of mineral acids such as HCl, $HNO_3$, and $H_2SO_4$ constitute the preferred solvents. Nevertheless, other solvents including organic acids can also be operable.

Prior Art

U.S. Pat. Nos. 4,102,664 and 4,880,453 record a number of patents which are generally relevant to the present inventive method and reference is made to those patents. Other patents far removed from the inventive method, but disclosing glasses having compositions in the BaO-$B_2O_3$ field, are briefly reviewed below:

U.S. Pat. No. 2,090,098 (Berger et al.) describes glasses demonstrating excellent resistance to hot metal vapors, notably sodium vapors, consisting essentially, in weight percent, of 10-40% $B_2O_3$, 25-80 bivalent metal oxides (MgO, CaO, BaO), and not more than 5% PbO and/or $R_2O$. No mention is made of forming articles with defect-free surfaces, which process constitutes the heart of the instant invention.

U.S. Pat. No. 2,899,584 (Verwey) is also directed to glasses suitable for use as envelopes for sodium vapor lamps. The glasses consisted essentially, in weight percent, of 10-30% $B_2O_3$, 20-30% $Al_2O_3$, and 30-60% CaO+BaO. Optional additions included up to 9% $SiO_2$ and 6% $K_2O$. Again, there is no reference to a method for forming articles having defect-free surfaces.

U.S. Pat. No. 4,717,690 (Hankey et al.) is drawn to glass-containing overglaze inks, the glass portion consisting essentially, in weight percent, of 15-43% BaO, 34-45% $B_2O_3$, 7-20% $Al_2O_3$, 1-7% of a dopant selected from 0-2% $Li_2O$, 0-2% $Na_2O$, 0-21% $K_2O$, and 0-3% PbO. Yet again, there is no description of a method for fabricating articles exhibiting defect-free surfaces, and, because the function of an overglaze ink is to provide mechanical and environment protection, a readily soluble glass would be illsuited for that utility.

U.S. Pat. Nos. 4,102,664 and 4,880,453 are believed to comprise the most pertinent prior art. The present invention is an improvement upon those two disclosures.

DESCRIPTION OF PREFERRED EMBODIMENTS

Tables I-VI report groups of glasses illustrating the compositional parameters of glasses operable in the present inventive method. The compositions are expressed in terms of cation percent on the oxide basis. The actual batch ingredients can comprise any materials, either the oxides or other compounds, which, when melted together, will be converted into the desired oxide in the proper proportions. For example, in the reported compositions $H_3BO_3$ provided the source of $B_2O_3$ and $BaCO_3$ the source of BaO. $Co_3O_4$ was included in two of the most preferred compositions in an amount of 0.1% by weight in addition to the base composition.

The batch ingredients were tumble mixed together, charged into platinum crucibles, lids placed atop the crucibles, and the crucibles introduced into a furnace operating at a temperature of about 1200° C. After a residence time of about 1 hour the resulting melt was poured into a steel mold to produce a glass slab having dimensions of about 6"×6"×0.5" ($\approx$15.25×15.25×1.25 cm), and that slab was immediately transferred to an annealer.

Tables I–VI also record determinations of softening point (S.P.), annealing point (A.P.), and strain point (St.P.) in terms of ° C., of linear coefficient of thermal expansion (Exp.) over the range of 25°–300° C. in terms of $\times 10^{-7}$/° C., and of the internal liquidus temperature (Liq.) in terms of ° C., as measured in accordance with techniques conventional in the glass art. Finally, Tables I–VI list the weight lost (Loss), expressed in terms of percent, demonstrated by the glasses after immersions, with stirring, in aqueous 1N HCl after four hours at 95° C.

Tables IA–VIA report the same groups of glass compositions, but expressed in terms of parts by weight on the oxide basis. Because the sum of the individual components totals or very closely approximates 100, however, for all practical purposes the values recited in the Tables can be deemed to represent weight percent.

TABLE I

Effect of Lead Oxide on Barium Borate Glasses

|  | 1 | 2 | 3 | 4 | 5 | 6 | 7 | 8 | 9 |
|---|---|---|---|---|---|---|---|---|---|
| $B_2O_3$ | 77 | 74.5 | 72.3 | 79.4 | 77.0 | 77.0 | 77.0 | 74.5 | 74.5 |
| BaO | 23 | 17.4 | 12.2 | 12.6 | 7.5 | 18.0 | 18.0 | 12.6 | 12.6 |
| PbO | — | 4.9 | 9.4 | 4.8 | 9.4 | — | — | 4.9 | 4.9 |
| $Al_2O_3$ | — | — | — | — | — | 5.0 | — | 4.8 | — |
| CaO | — | — | — | — | — | — | 5.0 | — | 4.8 |
| $SiO_2$ | — | 3.2 | 6.1 | 3.2 | 6.1 | — | — | 3.2 | 3.2 |
| S.P. | 649 | 637 | 608 | 617 | 591 | 646 | 656 | 617 | 638 |
| A.P. | 580 | 555 | 523 | 536 | 503 | 567 | 587 | 530 | 557 |
| St.P. | 560 | 530 | 498 | 511 | 478 | 541 | 565 | 503 | 532 |
| Exp. | 87.0 | 77.8 | 74.4 | 72.9 | 69.9 | 76.6 | 84.9 | 72.4 | 76.8 |
| Liq. | 908 | 805 | 738 | 639 | <639 | <754 | 947 | <604 | 737 |
| Loss | 100 | 100 | 100 | 100 | 100 | 100 | 100 | 100 | 100 |

TABLE IA

|  | 1 | 2 | 3 | 4 | 5 | 6 | 7 | 8 | 9 |
|---|---|---|---|---|---|---|---|---|---|
| $B_2O_3$ | 43.32 | 39.75 | 36.87 | 46.63 | 42.73 | 47.20 | 47.00 | 42.97 | 42.80 |
| BaO | 56.68 | 40.66 | 27.25 | 32.34 | 18.23 | 48.33 | 48.12 | 31.83 | 31.70 |
| PbO | — | 16.66 | 30.54 | 17.92 | 33.24 | — | — | 18.08 | 17.93 |
| $Al_2O_3$ | — | — | — | — | — | 4.47 | — | 4.03 | — |
| CaO | — | — | — | — | — | — | 4.88 | — | 4.41 |
| $SiO_2$ | — | 2.93 | 5.33 | 3.21 | 5.80 | — | — | 3.16 | 3.15 |

Table I illustrates the effectiveness of PbO in reducing the viscosity of the glass in the transformation range along with lowering the liquidus temperature. That the presence of $Al_2O_3$ and CaO produces opposite effects is also demonstrated in Table I. The greater impact resulting from the inclusion of CaO is evidenced in Examples 7 and 9. As can be seen, however, the incorporation of those components in minor amounts permits the properties of the glasses to be adjusted to desired values to match those of the durable glass.

TABLE II

Effect of Alkali Metal Oxides on Barium Borate Glasses

|  | 10 | 11 | 12 | 13 | 14 | 15 | 16 | 17 | 18 |
|---|---|---|---|---|---|---|---|---|---|
| $B_2O_3$ | 86.4 | 81.7 | 81.7 | 82.4 | 77.8 | 77.8 | 77.3 | 72.8 | 72.8 |
| BaO | 13.6 | 7.5 | 5.7 | 17.6 | 11.1 | 11.1 | 22.7 | 15.6 | 15.6 |
| $Na_2O$ | — | 10.8 | — | — | 11.1 | — | — | 11.6 | — |
| $K_2O$ | — | — | 10.8 | — | — | 11.1 | — | — | 11.6 |
| S.P. | 655 | * | 588 | 658 | * | 599 | 659 | 601 | * |
| A.P. | 562 |  | 480 | 574 |  | 482 | 570 | 511 |  |
| St.P. | 541 |  | 454 | 550 |  | 454 | 547 | 486 |  |
| Exp. | 69.3 |  | 87.2 | 75.5 |  | 91.9 | 76.9 | 93.5 |  |
| Liq. | 816 |  | 743 | 844 |  | 760 | 824 | 718 |  |
| Loss | 100 |  | 100 | 100 |  | 100 | 100 | 100 |  |

* Partially devitrified

TABLE IIA

|  | 10 | 11 | 12 | 13 | 14 | 15 | 16 | 17 | 18 |
|---|---|---|---|---|---|---|---|---|---|
| $B_2O_3$ | 59.19 | 65.83 | 63.31 | 51.67 | 57.10 | 55.05 | 43.74 | 48.08 | 46.46 |
| BaO | 40.81 | 26.47 | 25.45 | 48.33 | 35.68 | 34.40 | 56.26 | 45.13 | 43.60 |
| $Na_2O$ | — | 7.71 | — | — | 7.22 | — | — | 6.79 | — |
| $K_2O$ | — | — | 11.24 | — | — | 10.55 | — | — | 9.94 |

Table II clearly illustrates the dramatic effect that the alkali metal oxides have in decreasing the softening, annealing, and strain points, while sharply increasing he thermal expansion. Table II also exemplifies the discovery that $Na_2O$ levels in excess of 10% lead to unstable glasses where the amount of $B_2O_3$ is in excess of about 75%, whereas concentrations of $K_2O$ in excess of 10% yield stable glasses where the $B_2O_3$ content is greater than about 75%; a contrasting situation exists in glasses with $B_2O_3$ levels below about 75%.

TABLE III

Effect of Alkali Metal Oxides on Lead Barium Borate Glasses

|  | 19 | 20 | 21 | 22 | 23 | 24 | 25 | 26 | 27 |
|---|---|---|---|---|---|---|---|---|---|
| $B_2O_3$ | 74.5 | 72.6 | 74.6 | 74.6 | 70.6 | 72.6 | 74.6 | 74.6 | 70.7 |
| BaO | 17.4 | 17.4 | 15.5 | 13.5 | 17.4 | 17.4 | 15.5 | 13.5 | 17.4 |
| PbO | 4.9 | 4.9 | 4.8 | 4.9 | 4.9 | 4.8 | 4.8 | 4.8 | 4.8 |
| $Li_2O$ | — | 1.9 | 1.9 | 3.9 | 3.9 | — | — | — | — |
| $Na_2O$ | — | — | — | — | — | 1.9 | 1.9 | 3.9 | 3.9 |
| $SiO_2$ | 3.2 | 3.2 | 3.2 | 3.2 | 3.2 | 3.2 | 3.2 | 3.2 | 3.2 |
| S.P. | 637 | 603 | 614 | 611 | 600 | 616 | 615 | 625 | 602 |
| A.P. | 555 | 516 | 525 | 527 | 515 | 529 | 528 | 543 | 516 |
| St.P. | 530 | 491 | 502 | 502 | 492 | 505 | 503 | 519 | 492 |
| Exp. | 77.8 | 78.1 | 79.0 | 84.3 | 85.6 | 80.9 | 84.6 | 81.2 | 87.9 |
| Liq. | 805 | 897 | 813 | 781 | 750 | 763 | 755 | 787 | 774 |
| Loss | 100 | 100 | 100 | 100 | 100 | 100 | 100 | 100 | 76 |

TABLE IIIA

|  | 19 | 20 | 21 | 22 | 23 | 24 | 25 | 26 | 27 |
|---|---|---|---|---|---|---|---|---|---|
| $B_2O_3$ | 39.75 | 38.96 | 41.59 | 43.35 | 38.13 | 38.91 | 41.35 | 43.06 | 37.92 |
| BaO | 40.66 | 40.90 | 37.85 | 34.36 | 41.16 | 40.85 | 37.67 | 34.13 | 40.88 |
| PbO | 16.66 | 16.76 | 17.05 | 18.14 | 16.86 | 16.39 | 16.97 | 17.65 | 16.40 |
| $Li_2O$ | — | 0.43 | 0.45 | 0.96 | 0.90 | — | — | — | — |
| $Na_2O$ | — | — | — | — | — | 0.90 | 0.93 | 1.99 | 1.85 |
| $SiO_2$ | 2.93 | 2.94 | 3.06 | 3.19 | 2.96 | 2.94 | 3.04 | 3.17 | 2.94 |

Table III illustrates the effects of alkali metal oxide additions in lowering the viscosity of the glasses in their transformation range while raising their coefficients of thermal expansion.

TABLE IV

Effect of Alumina on Alkali Metal Lead Barium Borate Glasses

|  | 28 | 29 | 30 | 31 | 32 | 33 | 34 | 35 | 36 |
|---|---|---|---|---|---|---|---|---|---|
| $B_2O_3$ | 74.5 | 72.6 | 74.6 | 72.6 | 74.6 | 70.7 | 70.7 | 68.8 | 68.8 |
| BaO | 12.6 | 12.6 | 10.7 | 12.6 | 10.6 | 12.6 | 12.6 | 12.6 | 12.6 |
| PbO | 4.9 | 4.8 | 4.8 | 4.8 | 4.8 | 4.8 | 4.8 | 4.8 | 4.8 |
| $Al_2O_3$ | 4.9 | 4.8 | 4.8 | 4.8 | 4.8 | 4.8 | 4.8 | 4.8 | 4.8 |
| $Na_2O$ | — | 1.9 | 1.9 | — | — | 3.9 | — | 5.8 | — |
| $K_2O$ | — | — | — | 1.9 | 1.9 | — | 3.9 | — | 5.8 |
| $SiO_2$ | 3.2 | 3.2 | 3.2 | 3.2 | 3.2 | 3.2 | 3.2 | 3.2 | 3.2 |
| S.P. | 616 | 604 | 606 | 609 | 606 | 599 | 598 | 589 | 590 |
| A.P. | 526 | 518 | 511 | 517 | 511 | 506 | 505 | 497 | 497 |
| St.P. | 500 | 492 | 484 | 491 | 484 | 479 | 478 | 471 | 470 |
| Exp. | 72.7 | 75.3 | 72.1 | 77.1 | 73.7 | 76.9 | 81.2 | 83.3 | 85.7 |
| Liq. | 681 | 810 | 809 | 704 | <694 | 833 | 755 | — | 701 |
| Loss | 100 | 100 | 100 | 100 | 100 | 100 | 100 | 100 | 100 |

TABLE IVA

|  | 28 | 29 | 30 | 31 | 32 | 33 | 34 | 35 | 36 |
|---|---|---|---|---|---|---|---|---|---|
| $B_2O_3$ | 42.93 | 42.08 | 44.88 | 41.87 | 44.77 | 41.01 | 40.59 | 39.96 | 39.35 |
| BaO | 31.80 | 31.99 | 28.20 | 31.83 | 27.86 | 32.01 | 31.68 | 32.05 | 31.56 |
| PbO | 17.99 | 17.73 | 18.40 | 17.64 | 18.35 | 17.74 | 17.56 | 17.76 | 19.49 |
| $Al_2O_3$ | 4.11 | 4.05 | 4.21 | 4.03 | 4.20 | 4.06 | 4.02 | 4.06 | 4.00 |
| $Na_2O$ | — | 0.98 | 1.01 | — | — | 2.00 | — | 2.98 | — |
| $K_2O$ | — | — | — | 1.47 | 1.53 | — | 3.01 | — | 4.45 |
| $SiO_2$ | 3.16 | 3.18 | 3.30 | 3.16 | 3.29 | 3.18 | 3.15 | 3.19 | 3.14 |

Table IV illustrates that additions of $Al_2O_3$ can be useful in reducing the viscosity of the glasses in their transformation range and lowering the liquidus temperature thereof.

TABLE V (Soft High Lead Barium Borate Glasses)

|  | 37 | 38 | 39 | 40 | 41 | 42 | 43 | 44 |
|---|---|---|---|---|---|---|---|---|
| $B_2O_3$ | 72.3 | 75.1 | 73.2 | 71.3 | 75.1 | 73.2 | 71.3 | 71.4 |
| BaO | 7.5 | 7.5 | 7.5 | 7.5 | 7.5 | 7.5 | 7.5 | 7.5 |
| PbO | 9.4 | 9.4 | 9.4 | 9.4 | 9.4 | 9.4 | 9.4 | 9.4 |
| $Al_2O_3$ | 4.7 | — | — | 1.9 | — | — | 1.9 | 1.9 |
| $Na_2O$ | — | 1.9 | 3.8 | 3.8 | — | — | — | 1.9 |
| $K_2O$ | — | — | — | — | 1.9 | 3.8 | 3.8 | 1.9 |
| $SiO_2$ | 6.1 | 6.1 | 6.1 | 6.1 | 6.1 | 6.1 | 6.1 | 6.1 |
| S.P. | 586 | 581 | — | 574 | 580 | 577 | 570 | 574 |
| A.P. | 495 | 490 | 485 | 481 | 490 | 482 | 480 | 481 |
| St.P. | 470 | 464 | 458 | 455 | 466 | 456 | 455 | 456 |
| Exp. | 68.6 | 72.2 | 73.4 | 75.9 | 73.4 | 77.2 | 77.2 | 76.8 |
| Liq. | <604 | 803 | 839 | 840 | 726 | 681 | 691 | 771 |
| Loss | 100 | 100 | 100 | 63 | 100 | 100 | 61 | 100 |

TABLE VA

|  | 37 | 38 | 39 | 40 | 41 | 42 | 43 |
|---|---|---|---|---|---|---|---|
| $B_2O_3$ | 39.65 | 41.73 | 40.72 | 39.47 | 41.53 | 39.10 | 39.32 |
| BaO | 18.02 | 18.25 | 18.27 | 18.19 | 18.16 | 18.01 | 18.09 |
| PbO | 32.84 | 33.28 | 33.32 | 33.16 | 33.12 | 32.84 | 32.98 |
| $Al_2O_3$ | 3.76 | — | — | 1.53 | — | 1.52 | 1.52 |
| $Na_2O$ | — | 0.94 | 1.87 | 1.86 | — | — | 0.93 |
| $K_2O$ | — | — | — | — | 1.41 | 2.80 | 1.40 |
| $SiO_2$ | 5.73 | 5.81 | 5.82 | 5.79 | 5.78 | 5.73 | 5.76 |

Table V illustrates the capability of high concentrations of PbO to very significantly reduce the viscosity of the glass in the transformation range. Table V also illustrates that a combination comprising $Al_2O_3$ with a substantial level of alkali metal oxide can result in a glass of significantly improved durability such as to render it less suitable as a cladding glass.

Table VI reports two glass compositions which have been found particularly useful with soda lime durable glasses inasmuch as the linear coefficients of thermal expansion closely approximate that of typical soda lime glass, viz., $\approx 86 \times 10^{-7}/°$ C. over the temperature range of 25°–300° C. $Co_3O_4$ was incorporated into the glass at a level of about 0.1% by weight to impart a blue color to the glass.

TABLE VI

|  | 45 | 46 |
|---|---|---|
| $B_2O_3$ | 71.0 | 71.0 |
| BaO | 13.0 | 13.0 |
| $K_2O$ | — | 6.0 |
| PbO | 5.0 | 5.0 |
| $Al_2O_3$ | 5.0 | 5.0 |
| $Na_2O$ | 6.0 | — |
| $Co_3O_4$ | 0.1 | 0.1 |
| S.P. | 579 | 576 |
| A.P. | 484 | 486 |
| St.P. | 458 | 467 |
| Exp. | 84.3 | 87.4 |
| Liq. | 829 | — |
| Loss | 100 | 100 |

TABLE VIA

|  | 45 | 46 |
|---|---|---|
| $B_2O_3$ | 41.18 | 40.54 |
| BaO | 33.03 | 32.51 |
| $K_2O$ | 18.48 | 18.19 |
| PbO | 4.23 | 4.16 |
| $Al_2O_3$ | 3.08 | — |
| $Na_2O$ | — | 4.60 |
| $Co_3O_4$ | 0.1 | 0.1 |

Tables I–VI clearly indicate that glasses exhibiting high solubility in acid solutions, coupled with a rather wide range of physical properties rendering them especially suitable for use as cladding glasses, can be prepared from compositions within the base BaO-PbO and/or $R_2O$-$B_2O_3$ system.

Table VII lists the compositions, expressed in terms of cation percent on the oxide basis, of five durable glasses which have been found to be operable in the present invention. Examples 47 and 48 comprised compositions of glasses marketed by PPG Industries, Pittsburgh, Pa., whereas the glasses labeled 0211, 0079, and 0281 denote glasses commercially marketed by Corning Incorporated, Corning, N.Y.

Examples 47 and 48 were prepared in like manner to Examples 1–46; i.e., the proper batch ingredients were tumble mixed together, charged into platinum crucibles, lids placed atop the crucibles, the crucibles introduced into a furnace operating at a temperature of about 1550° C., the crucibles withdrawn from the furnace after about 4 hours, the resulting melts poured into a steel mold to produce a glass slab having dimensions of about $6'' \times 6'' \times 0.5''$ ($\approx 1525 \times 15.25 \times 1.25$ cm), and that slab immediately transferred to an annealer.

Table VIIA reports the same group of glass compositions, but expressed in terms of parts by weight on the oxide basis. Inasmuch as the sum of the individual components very closely approximates 100, for all practical purposes the values recorded in Table VIIA can be considered to reflect weight percent.

TABLE VII

|  | 47 | 48 | 0211 | 0079 | 0281 |
|---|---|---|---|---|---|
| $SiO_2$ | 63.5 | 48.3 | 55.3 | 62.3 | 64.9 |
| $Na_2O$ | 23.3 | 16.7 | 12.0 | 27.3 | 24.4 |
| CaO | 8.3 | — | — | 4.3 | 8.4 |
| MgO | 4.9 | — | — | 4.3 | — |
| $Al_2O_3$ | — | 16.9 | 2.1 | 1.0 | 1.4 |
| $TiO_2$ | — | — | 3.3 | 0.8 | — |
| $ZrO_2$ | — | 1.6 | — | — | — |
| $Li_2O$ | — | 16.5 | — | — | — |
| $B_2O_3$ | — | — | 14.1 | — | 0.9 |
| $K_2O$ | — | — | 8.6 | — | — |
| ZnO | — | — | 4.6 | — | — |
| S.P. | 723 | 707 | 720 | 696 | 730 |
| A.P. | 544 | 509 | 550 | 515 | 550 |
| St.P. | 504 | 464 | 508 | 475 | 510 |
| Exp. | 86 | 89.5 | 73.8 | 93.5 | 85 |
| Liq. | 988 | 990 | 821 | 800 | 890 |
| Loss | 0.02 | 0.08 | 0.07 | $\approx 0.01$ | 0.01 |

TABLE VIIA

|  | 47 | 48 | 0211 | 0079 | 0281 |
|---|---|---|---|---|---|
| $SiO_2$ | 73.37 | 61.39 | 62.17 | 73.03 | 74.54 |
| $Na_2O$ | 13.91 | 10.97 | 6.98 | 16.61 | 14.48 |
| CaO | 8.95 | — | — | 4.73 | 9.01 |
| MgO | 3.77 | — | — | 3.38 | — |
| $Al_2O_3$ | — | 18.26 | 2.01 | 1.0 | 1.37 |
| $TiO_2$ | — | — | 4.96 | 1.26 | — |
| $ZrO_2$ | — | 4.18 | — | — | — |
| $Li_2O$ | — | 5.21 | — | — | — |
| $B_2O_3$ | — | — | 9.26 | — | 0.6 |
| $K_2O$ | — | — | 7.59 | — | — |
| ZnO | — | — | 7.03 | — | — |

To illustrate the capability of providing defect-free surfaces on bodies of the durable glasses of Table VII, 4" ($\approx 10.2$ cm) squares were cut from the slabs of Examples 4, 8, 17, 22, 25, 36, 45, and 46. Those squares were sagged to a spherical arc prior to lamination in accordance with the procedure outlined in U.S. Pat. No. 4,880,453 through heat treatment at a temperature about 25° C. above the softening points of the glasses. Thereafter, the convex side of the sagged squares was ground and polished to remove any surface blemishes.

Squares of about 4.5" ($\approx 11.4$ cm) were cut from each of the durable glasses set out in Table VII and a laminate prepared in accordance with the procedure outlined in U.S. Pat. No. 4,880,453. As was described therein, the top temperature employed in forming the laminate was but a few degrees above the softening point of the more soluble glass, i.e., at a viscosity of about $10^7$ poises. The laminates were subsequently reformed by pressing into a mold as reported in U.S. Pat. No. 4,880,453, utilizing a temperature at which the more soluble glass ranged about $10^5$–$10^6$ poises.

The more soluble glass lamina was removed through immersion into an aqueous 1N HCl solution at a temperature of 95° C. with stirring.

Defect-free surfaces were formed on Example 47 employing Examples 22 and 25 as cladding glasses. Defect-free surfaces were formed on Example 48 with Examples 36, 45, and 46 as the cladding glasses. Defect-free surfaces were formed on Glass 0211 with Examples 4 and 8. Defect-free surfaces were formed on Glass 0079 with Example 17. Defect-free surfaces were formed on Glass 0281 with Examples 22 and 25.

Whereas the above-described process involved laminating an individual, integral body of durable glass with a body of glass of the instant invention at a temperature at which at least the latter glass is in a fluid condition, it will be appreciated that, similarly to the disclosure of U.S. Pat. No. 4,102,644, bodies of the two glasses in the form of streams can be brought together while in a fluid state, i.e., at viscosities no higher than about $10^7$ poises, to form a laminated article. Thus, it is only necessary that the durable glass and the highly soluble glass be brought together while at least the latter glass is in the fluid state. Finally, whereas in the above-described processes only one side of the durable glass was clad with the soluble glass, it will be realized that, where desired, an additional side of the durable glass can be contacted or the body completely enveloped within the soluble glass of the present invention.

I claim:

1. A method for preparing a glass article having at least one surface which is substantially defect-free and is at least equivalent in smoothness to a ground and polished glass surface which comprises the steps of:
   (a) bringing into contact with each other a body of a first glass which is relatively insoluble in an acid solution and a body of a second glass consisting essentially, expressed in terms of cation percent on the oxide basis, of 70-85% $B_2O_3$, 7-20% BaO, 0-10% PbO, 0-12% $R_2O$, wherein $R_2O$ consists of $Li_2O + Na_2O + K_2O$, and 3-15% $PbO + R_2O$, said second glass having
      (1) from its setting point to room temperature, a linear coefficient of thermal expansion within about $5 \times 10^{-7}/°$ C. of that of said relatively insoluble first glass,
      (2) a strain point within about 10° C. of the strain point of said relatively insoluble first glass,
      (3) a liquidus temperature below that of said relatively insoluble first glass,
      (4) a linear coefficient of thermal expansion over the temperature range 25°-300° C. between about $65-95 \times 10^{-7}/°$ C.,
      (5) a softening point between 640° C., and
      (6) a viscosity at the forming temperature of the relatively insoluble first glass, where said forming temperature is the temperature at which the viscosity of the relatively insoluble first glass is between about $10^4$-$10^8$ poises, at least 10 times less than that of said relatively insoluble first glass;
   and said second glass being at least 100 times more soluble in an acid solution than said relatively insoluble first glass, said contact being at a temperature wherein at least said second glass is in fluid form at a viscosity of about $10^4$-$10^8$ poises to produce a laminate having an interface between the two glass bodies which is substantially free of defects;
   (b) cooling said laminate to solidify each glass present in fluid form; and thereafter
   (c) contacting said laminate with an acid solution to dissolve away said second glass whereby the surface of said relatively insoluble first glass from which said second glass has been removed is rendered substantially defect-free and is at least equivalent in smoothness to a ground and polished glass surface.

2. A method according to claim 1 wherein said second glass also contains up to 12% total of at least one oxide in the indicated proportion selected from the group consisting of 0-5% $Al_2O_3$, 0-6% CaO, and 0-7% $SiO_2$.

3. A method according to claim 1 wherein said second glass contains 5-13% $PbO + R_2O$.

4. A method according to claim 1 wherein said acid solution is a mineral acid.

5. A method for preparing a glass article having at least on surface which is substantially defect-free and is at least equivalent in smoothness to a ground and polished glass surface which comprises the steps of:
   (a) bringing into contact with each other a body of a first glass which is relatively insoluble in an acid solution and a body of a second glass consisting essentially, expressed in terms of cation percent on the oxide basis, of 70-85% $B_2O_3$, 7-20% BaO, 0-10% PbO, 0-12% $R_2O$, wherein $R_2O$ consists of $Li_2O + Na_2O + K_2O$, and 3-15% $PbO + R_2O$, said second glass having
      (1) from its setting point to room temperature, a linear coefficient of thermal expansion within about $5 \times 10^{-7}/°$ C. of that of said relatively insoluble first glass,
      (2) a strain point within about 10° C. of the strain of said relatively insoluble first glass,
      (b 3) a liquidus temperature below that of said relatively insoluble first glass,
      (4) a linear coefficient of thermal expansion over the temperature range 25°-300° C. between about $65-95 \times 10^{-7}/°$ C.,
      (5) a softening point below 640° C., and
      (6) a viscosity at the forming temperature of the relatively insoluble first glass, where said forming temperature is the temperature at which the viscosity of the relatively insoluble first glass is between about $10^4$-$10^8$ poises, at least 10 times less than that of said relatively insoluble first glass;
   and said second glass being at least 100 times more soluble in an acid solution than said relatively insoluble first glass to produce a laminate having mating surfaces between the two glass bodies;
   (b) exposing said laminate to a temperature at which the surface of at least said second glass is in fluid form at a viscosity of at least $10^4$-$10^8$ poises to produce an interface between the two glass bodies which is substantially free of defects;
   (c) cooling said laminate to solidify each glass present in fluid form; and thereafter
   (d) contacting said laminate with an acid solution to dissolve away said second glass whereby the surface of said relatively insoluble first glass from which said second glass has been removed is rendered substantially defect-free and is equivalent in smoothness to a ground and polished glass surface.

6. A method according to claim 5 wherein said second glass also contains up to 12% total of at least one oxide in the indicated proportion selected from the group consisting of 0-5% $Al_2O_3$, 0-6% CaO, and 0-7% $SiO_2$.

7. A method according to claim 5 wherein said second glass contains 5-13% $PbO + R_2O$.

8. A method according to claim 5 wherein said acid solution is a mineral acid.

* * * * *

UNITED STATES PATENT AND TRADEMARK OFFICE
CERTIFICATE OF CORRECTION

PATENT NO. : 5,100,452

DATED : March 31, 1992

INVENTOR(S) : William H. Dumbaugh, Jr.

It is certified that error appears in the above-identified patent and that said Letters Patent is hereby corrected as shown below:

Column 3, line 57, change "By" to --My--.

Column 4, line 31, change "anneling" to --annealing--.

Column 11, line 63, change "1525" to --15.25--.

Claim 5, column 14, line 9, change "on" to --one--.

Claim 5, column 14, line 26, change "(b 3)" to --(3)--.

Signed and Sealed this

Nineteenth Day of October, 1993

Attest:

BRUCE LEHMAN

*Attesting Officer*  *Commissioner of Patents and Trademarks*